United States Patent [19]

Naruo et al.

[11] Patent Number: 4,486,500

[45] Date of Patent: Dec. 4, 1984

[54] MAGNETIC RECORDING MEDIUM

[75] Inventors: Kyoichi Naruo; Nobuyuki Yamamoto; Tsutomu Okita, all of Shizuoka, Japan

[73] Assignee: Fuji Photo Film Co., Ltd., Kanagawa, Japan

[21] Appl. No.: 542,899

[22] Filed: Oct. 19, 1983

Related U.S. Application Data

[63] Continuation of Ser. No. 356,547, Mar. 9, 1982, abandoned.

[30] Foreign Application Priority Data

Mar. 9, 1981 [JP] Japan .................................. 56-33580

[51] Int. Cl.$^3$ .............................................. B05D 5/12
[52] U.S. Cl. ...................................... 428/336; 427/44; 427/54.1; 428/694; 428/695; 428/900

[58] Field of Search .................. 427/127–132, 427/48, 54.1, 44; 428/900, 694, 695, 336

[56] References Cited

U.S. PATENT DOCUMENTS

| | | | |
|---|---|---|---|
| 3,466,156 | 9/1969 | Peters et al. | 427/131 |
| 4,199,421 | 4/1980 | Kamada et al. | 427/44 |
| 4,335,183 | 6/1982 | Hosaka | 427/44 |

Primary Examiner—Bernard D. Pianalto
Attorney, Agent, or Firm—Sughrue, Mion, Zinn, Macpeak, and Seas

[57] ABSTRACT

A magnetic recording medium having a thin magnetic metal film on a non-magnetic base is disclosed. A surface layer is formed on either the thin magnetic metal film or the other side of the base or both by irradiating a coating of a polymer having an unsaturated bond polymerizable by radiation. A process for producing such magnetic recording medium is also disclosed.

8 Claims, No Drawings

MAGNETIC RECORDING MEDIUM

This application is a continuation of application Ser. No. 356,547, filed Mar. 9, 1982, abandoned.

FIELD OF THE INVENTION

The present invention relates to a magnetic recording medium comprising a thin magnetic film as a magnetic recording layer, more particularly, to a magnetic recording medium of the thin metal film type having good running properties, wear resistance and electro-to-magnetic conversion characteristics.

BACKGROUND OF THE INVENTION

Most of conventional magnetic recording media are of the coated type and are produced by dispersing particles of magnetic oxides or ferromagnetic alloys such as $\gamma\text{-Fe}_2\text{O}_3$, Co-doped $\gamma\text{-Fe}_2\text{O}_3$, $\text{Fe}_3\text{O}_4$, Co-doped $\text{Fe}_3\text{O}_4$, a Berthollide compound of $\gamma\text{-Fe}_2\text{O}_3$ and $\text{Fe}_3\text{O}_4$ and $\text{CrO}_2$ into an organic binder such as a vinyl chloride/vinyl acetate copolymer, a styrene/butadiene copolymer, an epoxy resin or a polyurethane resin, applying the resulting coating solution to a non-magnetic base, and drying the coating.

With recent demands for higher density recording, research has been directed to magnetic recording media of the thin metal film type which uses a thin ferromagnetic metal film as a magnetic recording layer, the same being formed by vapor deposition, such as vacuum deposition, sputtering or ion plating, or plating such as electroplating or electroless plating. Various efforts are being made to use such recording medium on a commercial scale.

Most magnetic recording media of the coated type uses a metal oxide with low saturation magnetization as the magnetic material, so attempts to achieve high density recording using a thinner magnetic recording medium results in a decreased signal output. However, with magnetic recording media of the thin metal film type, a very thin magnetic recording layer can be formed using a ferromagnetic metal having higher saturation magnetization than that of a magnetic oxide without using a non-magnetic material as a binder, and such thin materials are advantageous for providing good electro-to-magnetic conversion characteristics.

However, thin metal film type magnetic recording media have their own problems: (1) high friction against magnetic heads, guide poles or other transport means in recording reproduction devices such as video tape decks, audio tape decks or copiers, which leads to high device wear; (2) ease of attack by corrosive environments; and (3) the magnetic recording layer can be damaged by impact during handling.

Attempts have been made to overcome these problems by forming a protective layer on the magnetic recording medium of thin metal film type.

One proposal is set out in Japanese Patent Application (OPI) No. 75001/75 (the term OPI as used herein means an unexamined published Japanese patent application) where a thin lubricant layer is formed on the metal film. Per this proposal, the coefficient of friction between the magnetic head or guide poles and the metal film is reduced so the tape runs consistently and is not likely to be abraded. However, these advantages are lost if the tape is used repeatedly. Another proposal occurs in Japanese Patent Application (OPI) Nos. 39708/78 and 40505/78 where a protective lubricant layer of a metal or metal oxide is formed on the thin metal film. However, even in this case the effect of the protective layer is short term, and as the tape is used, the friction coefficient rapidly increases or the thin magnetic metal film breaks.

Yet another proposal occurs in Japanese Patent Application (OPI) No. 155010/79 were an overcoat of a high molecular weight film having a thickness of about $0.2\mu$ is formed on the metal film; however, this results in a spacing loss which, in turn, leads to reduced output in high density recording.

To achieve high density recording, most thin magnetic metal films are supported on a smooth base, but no matter how smooth the base is, no lubricating method described above provides a magnetic recording medium having good running properties, especially in high humidity, or high wear resistance.

SUMMARY OF THE INVENTION

One object of the present invention is to provide a magnetic recording medium of the thin metal film type that has good running properties, good wear resistance and good electro-to-magnetic conversion characteristics, and to provide a process for producing the same.

Another object of the present invention is to provide a magnetic recording medium of the thin metal film type that retains good running properties and wear resistance for an extended period of time, and to provide a process for producing the same.

As a result of research to achieve these objects, we have found that a magnetic recording medium of the thin metal film type that retains good electro-to-magnetic conversion characteristics, good running properties, wear resistance and scratch resistance for an extended period of time, can be produced by forming, on either the thin magnetic metal film, or the surface of the non-magnetic base opposite the thin magnetic metal film, or both, a coating of a polymer having unsaturated bonds that are radiation polymerizable and by exposing said polymer coating to radiation.

DETAILED DESCRIPTION OF THE INVENTION

The thin magnetic metal film used in the present invention can be formed by vapor deposition or plating; vapor deposition is preferred since it rapidly forms the desired thin metal film, involves simple steps and requires no effluent treatment. Vapor deposition is a process where an element or its compound is heated in vacuo until it vaporizes or ionizes and condenses on the surface of a substrate; amoung variations of this process are vacuum vapor deposition, sputtering, ion plating and chemical vapor phase plating.

The magnetic recording layer of the present invention is a thin film that is formed by vapor deposition or plating of a ferromagnetic metal such as iron, cobalt or nickel, or a ferromagnetic alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-No-Ag, Co-Ni-Na, Co-Ni-Ce, Co-Ni-Zn, Co-Ni-Cu, Co-Ni-W, Co-Ni-Re or Co-Sm-Cu. The thickness of the layer in a magnetic recording medium is preferably in the range of 0.05 to 2 $\mu$m, more preferably 0.1 to 0.4 $\mu$m.

The material that forms a coating on either the thin magnetic metal film, or the surface of the non-magnetic base opposite the thin magnetic metal film, or both, is a polymer having unsaturated bonds that are polymerizable by radiation. Preferred types of radiation include electron beams and ultraviolet rays. If electron beams are used, preferred polymers are such that they form a continuous coating by crosslinking upon irradiation with an absorbed dose of 2 to 10 megarads at an acceleration voltage of 100 to 300 kilovolts.

Suitable examples of such polymers are those compounds preferably containing more than one carbon-carbon unsaturated bond, such as those containing one or more acryloyl groups, acrylamido groups, allyl groups, vinyl ether groups, vinyl thio-ether groups, etc., as well as unsaturated polyesters.

Particularly preferred compounds are unsaturated polyesters, unsaturated polyacrylates and unsaturated polycarbonates having a molecular weight of 1,000 to 20,000 as determined by the GPC method; such compounds are cited in A. Vrancken, "Fatipec Congress", 11, 19 (1972), hereby incorporated by reference. These polymers may further contain a monomer having at least one carbon-carbon unsaturated bond in the molecule in a proportion of 1/9 to 9/1 by weight relative to the polymer and/or an organic solvent in an amount of less than 10% by weight relative to the polymer. Examples of such monomers include acrylic acid, methyl acrylate, styrene, acrylonitile, vinyl acetate, and homologues thereof. Two or more unsaturated bonds may be present in the molecule. Examples of such compounds are disclosed in "Kankosei Jushi Data-shu (A List of Data on Photosensitive Resins)", published by Sogo Kagaku Kenkyosho, December 1968, pp. 235-236.

Particularly preferred compounds are ethylene diacrylate, glycerol diacrylate, pentaerythritol tetraacrylate, 1,5-pentanediol diacrylate and glycerol triacrylate. One or more monomers having one unsaturated bond in their molecules may also be used in combination with one or more monomers having two or more unsaturated bonds.

If ultraviolet rays are used as the radiation, the preferred polymer is one which forms a continuous coating upon exposure to a UV lamp (80 W/cm) for a period of 0.1 to 10 seconds. The resins mentioned before in connection with exposure to electron beams may also be used for UV exposure. They may also contain one or more monomers having at least one carbon-carbon unsaturated bond in the molecule and/or an organic solvent.

A sensitizer may be used to achieve efficient curing with ultraviolet rays. Such sensitizer can be used in an amount of 0.1 to 10% by weight based on the weight of the polymer. Suitable sensitizers include benzoins such as benzoin and alkyl ethers thereof, preferably those having a weight average molecular weight of 100 to 1,000 as determined by the GPC method; acetophenones such as trichloroacetophenone; ketoneamine redox systems comprising a combination of a carbonyl compound, preferably that having a weight average molecular weight of 100 to 1,000 as determined by the GPC method, and a reducing agent, particularly a tertiary amine, preferably that having a weight average molecular weight of 100 to 1,000 as determined by the GPC method; and benzyl methyl ketal. The resins may further contain a stabilizer. Preferred monomers are the same as those described in connection with curing with electron beams.

Whether electron beams or ultraviolet rays are used, suitable organic solvents include ketones such as acetone, methyl ethyl ketone, methyl isobutyl ketone and cyclohexanone; esters such as methyl acetate, ethyl acetate, butyl acetate, ethyl lactate, and glycol acetate monoethyl ether; ether and glycol ethers such as glycol dimethyl ether, glycol monoethyl ether and dioxane; tars (aromatic hydrocarbons) such as benzene, toluene and xylene; and chlorinated hydrocarbons such as methylene chloride, ethylene chloride, carbon tetrachloride, chloroform, ethylene chlorohydrin and dichlorobenzene.

The coating of the polymer described above can be formed on the thin magnetic metal film or on the surface of the non-magnetic base opposite the thin magnetic metal film by air doctor coating, blade coating, air knife coating, squeeze coating, impregnate coating, reverse roll coating, transfer roll coating, gravure coating, kiss coating, cast coating, spray coating, spin coating etc. For details of these and other useful coating techniques, see "Coating Kogaku (Coating Engineering)", published by Asakura Shoten, Mar. 20, 1971, pp. 253-277. The thickness of the polymer coating is preferably less than 0.5 $\mu$m, more preferably less than 0.1 $\mu$m.

Suitable accelerators for electron beam exposure include a van de Graaff scanning accelerator, a double scanning accelerator and a curtain beam accelerator; a curtain beam accelerator is preferred for its relatively low cost and high power output. The acceleration voltage is generally in the range of from 100 to 1000 kilovolts, preferably from 100 to 300 kilovolts. The absorbed dose is generally from 0.5 to 20 megarads, preferably from 2 to 10 megarads. An acceleration voltage of less than 100 kilovolts does not achieve the desired energy transmission while an acceleration voltage higher than 1000 kilovolts is not economical since the efficiency of energy used in polymerization is decreased. If the absorbed dose is less than 0.5 megarads, the curing reaction is not sufficient to provide the desired polymer costing while if the absorbed dose exceeds 20 megarads, the efficiency of energy used in the curing is decreased or the thin magnetic metal film or the base being irradiated generates undesired heat.

A suitable UV lamp is one that delivers an electrical output of 30 to 160 watts per cm of the wavelength of the UV radiation issued. Because of high curing efficiency, low price and high radiation efficiency, a UV lamp having an output of 60 to 100 watts/cm is preferred, and one having an output of 80 watts/cm is generally employed.

Even better running properties, wear resistance and scratch resistance can be achieved by incorporating a lubricant in, or forming a lubricant layer on, the polymer coating thus formed on the thin magnetic metal film and cured with radiation. Suitable lubricants include aliphatic acids, metal soaps, aliphatic acid amides, aliphatic acid esters, mineral oils, vegetable oils, animal oils such as whale oil, higher alcohols, and silicone oil; fine, electrically conductive particulate materials such as graphite; fine inorganic particulate materials such as molybdenum disulfide and tungsten disulfide; fine particles of plastics such as polyethylene, polypropylene, polyethylene/vinyl chloride copolymer and polytetrafluoroethylene; $\alpha$-olefin polymers; unsaturated aliphatic hydrocarbons that are liquid at ordinary temperatures (i.e. those compounds having an n-olefin double bond attached to a terminal carbon atom), fluorocarbons and mixtures thereof. If desired or necessary, the lubricant may be used in combination with a corrosion inhibitor as described in Japanese Patent Application (OPI) Nos. 63494/76 and 41204/78) or a mold inhibitor (as described in Japanese Patent Application No. 26880/79).

Aliphatic acids, metal soaps, aliphatic acid amides, and aliphatic acid esters are preferred, and aliphatic acids having 10 or more carbon atoms are particularly preferred as the lubricant.

Examples of the solvent used for application of the lubricant include ketones such as acetone, methyl ethyl ketone, methylisobutyl ketone and cyclohexanone; alcohols having 1 to 10 carbon atoms such as methanol, ethanol, propanol and butanol; esters such as methyl acetate, ethyl acetate, butyl acetate, ethyl lactate, and glycol acetate monoethyl ether; ether and glycol ethers such as glycol dimethyl ether, glycol monoethyl ether and dioxane; hydrocarbons such as pentane, hexane, heptane, octane, nonane and decane; tars (aromatic hydrocarbons) such as benzene, toluene and xylene; chlorinated hydrocarbons such as methylene chloride, ethylene chloride, carbon tetrachloride, chloroform, ethylene chlorohydrin and dichlorobenzene.

The lubricant is generally used in a dry weight of from 2 to 100 mg/m$^2$, preferably from 2 to 50 mg/m$^2$, more preferably from 2 to 20 mg/m$^2$, in a layer or in the polymer coating.

The magnetic recording medium of thin magnetic metal film according to the present invention provides the following advantages:

(1) It has small dynamic and static friction coefficients;

(2) When it is used on an audio or video tape deck or other recording/reproducing devices for an extended period of time, it undergoes only a small increase in dynamic and static friction coefficient;

(3) It runs consistently without jitter or other undesired video instabilities;

(4) The above characteristics are not impaired in very humid atmospheres; and (5) It has good electro-to-magnetic conversion characteristics.

The present invention will now be described in greater detail by reference to the following examples and comparative examples which are given here for illustrative purposes only and are by no means intended to limit its scope. In the examples and comparative examples, all parts are by weight.

EXAMPLE 1

A magnetic cobalt film (0.2μ thick) was formed on a polyethylene terephthalate film (20μ thick), i.e., electron beams were used to condense cobalt vapor (99.95% purity) which was directed onto the PET film at an angle of incidence of 70° at a pressure of 5×10$^{-5}$ Torr. A polymer coating solution I of the formulation given below was applied onto the Co film and the base film at a dry thickness of 100 Å and dried at 30° C. for 10 seconds to provide magnetic tape A.

| Polymer coating solution I | |
| --- | --- |
| Urethane acrylate described in Example 1 of U.S. Pat. No. 4,092,173 | 0.7 part |
| Diethylene glycol diacrylate | 0.3 part |
| Methyl ethyl ketone | 200 parts |

The Co film and the side of the base opposite the Co film were then irradiated with electron beams at an acceleration voltage of 200 kilovolts until the absorbed dose was 3 megarads. A lubricant coating solution II of the formulation given below was applied onto both the polymer coating and the base at a weight of 10 mg/m$^2$ and dried at 50° C. for 10 seconds. The dried film was slit into a video tape ½ inch wide which is referred to as Sample No. 1.

| Lubricant coating solution II | |
| --- | --- |
| Myristic acid | 1.6 parts |
| Butyl stearate | 0.4 part |
| n-Hexane | 400 parts |

EXAMPLE 2

Following the procedure of Example 1, a polymer coating solution I' of the formulation given below was applied onto the Co film and the PET base film in a dry thickness of 100 Å and dried at 30° C. for 10 seconds to provide magnetic tape A'.

| Polymer coating solution I' | |
| --- | --- |
| Urethane acrylate described in Example 1 of U.S. Pat. No. 4,092,173 | 0.7 part |
| Diethylene glycol diacrylate | 0.3 part |
| Benzophenone/4,4'-bisdiethyl aminobenzophenone | 0.001 part |
| Methyl ethyl ketone | 200 parts |

The Co film and the side of the base opposite the Co film were exposed to a UV lamp (80 W/cm) for one second. A lubricant coating solution II of the same formulation as was used in Example 1 was applied onto both the polymer coating and the base in a dry weight of 10 mg/m$^2$ and dried at 50° C. for 10 seconds. The dried film was slit into a video tape ½ inch wide which was referred to as Sample No. 2.

COMPARATIVE EXAMPLE 1

A video tape was prepared as in Example 1 except that the Co magnetic film was simply formed on a PET base by oblique deposition without using polymer coating or a lubricant layer. The tape was referred to as Sample C-1.

COMPARATIVE EXAMPLE 2

A video tape was prepared as described in Example 1 except that polymer coating solution I was replaced by polymer coating solution III of the following formulation and that the resulting polymer coating was not irradiated with electron beams. The tape was referred to as Sample C-2.

| Polymer coating solution III | |
| --- | --- |
| Vinyl chloride/vinylidene chloride copolymer (copolymerization ratio in mols: 7/3, degree of polymerization: ca. 400) | 1.0 part |
| Methyl ethyl ketone | 200 parts |

COMPARATIVE EXAMPLE 3

A video tape was prepared as described in Example 1 except that only lubricant coating solution II was applied to both the Co film and the base without exposure to electron beams. The tape was referred to as Sample C-3.

The five samples were subjected to film durability (wear resistance) testing and measurement of dynamic friction coefficient.

(1) Durability

Durability of a magnetic thin film was determined when pressing a magnetic tape against a magnetic head at a tension of 90 g/½ inch and reciprocating at 38 cm/sec. 500 times. The number of abrasions that were formed on the tape surface was counted visually.

(2) Measurement of dynamic friction coefficient

The magnetic tape was reciprocated on a VHS video tape recorder (Maclord 88, Model NV-8800, from Matsushita Electric Industrial Co., Ltd.) one, 20 times, 100 times, and 500 times, and the change in the dynamic friction coefficient ($\mu$) was examined by the formula $T_2/T_1 = e^{\mu\pi}$ wherein $T_1$ is the tape tension at the supply side of the rotary cylinder and $T_2$ is the tape tension at the takeup side. The testing and measurement results are shown in Table 1.

As for the surface of the base, measurement of only dynamic friction coefficient was conducted with respect to the base surface of each of the tapes of Examples 1 and 2 and that of the tape of Comparative Example 1. The surfaces of the respective bases were referred to as Sample Nos. 3 and 4 and C-4. The results obtained are also shown in Table 1.

As the data show, the magnetic recording media of the thin metal film type according to the present invention have very good running properties and wear resistance. Furthermore, the improvement in these properties is retained for an extended period of time. For this reason, the medium is a product having high commercial value.

TABLE 1

| Sample No. | Sliding face | Polymer coating | Lubricant | (1) Abrasion after 500 reciprocations | (2) Change in dynamic friction coefficient | | | |
|---|---|---|---|---|---|---|---|---|
| | | | | | 1 | 20 | 100 | 500 |
| | | | | | (times of reciprocation) | | | |
| No. 1 | magnetic surface | urethane acrylate diethylene glycol diacrylate irradiated with electron beams | myristic acid butyl stearate | no abrasion | 0.30 | 0.30 | 0.32 | 0.35 |
| No. 3 | base surface | diethylene glycol diacrylate irradiated with electron beams | butyl stearate | | 0.31 | 0.31 | 0.32 | 0.36 |
| C-1 | magnetic surface | | | more than 10 deep abrasions | 0.48 | 0.55 | 0.58 | 0.67 |
| C-2 | magnetic surface | vinyl chloride/ vinylidene chloride copolymer | butyl stearate | 4 or 5 shallow abrasions | 0.31 | 0.38 | 0.40 | 0.51 |
| C-3 | magnetic surface | | butyl stearate | more than 10 deep abrasions | 0.30. | 0.33 | 0.41 | 0.57 |
| C-4 | base surface | | | | 0.35 | 0.40 | 0.57 | 0.59 |
| No. 2 | magnetic surface | urethane acrylate diethylene glycol diacrylate irradiated with UV rays | myristic acid butyl stearate | no abrasion | 0.31 | 0.32 | 0.34 | 0.36 |
| No. 4 | base surface | diethylene glycol diacrylate irradiated with UV rays | butyl stearate | | 0.31 | 0.33 | 0.35 | 0.37 |

While the invention has been described in detail and with reference to specific embodiments thereof, it will be apparent to one skilled in the art that various changes and modifications can be made therein without departing from the spirit and scope thereof.

What we claim is:

1. A magnetic recording medium having a thin magnetic metal film on a non-magnetic base, a surface layer with a thickness less than 0.5 μm being formed on either the thin magnetic metal film or the other side of the base or both, said surface layer being formed by irradiating a coating of a polymer having an unsaturated bond polymerizable by radiation, said polymer having an unsaturated bond polymerizable by radiation being an unsaturated polyester, an unsaturated polyacrylate or an unsaturated polycarbonate and said polymer having a molecular weight of 1,000 to 20,000, wherein said surface layer provides a degree of abrasive resistance resulting in a dynamic coefficient of 0.40 or less after 500 reciprocations, of said recording medium.

2. A magnetic recording medium according to claim 1 wherein the polymer coating further contains a monomer having at least one carbon-carbon unsaturated bond and/or an organic solvent or both said monomer and said organic solvent.

3. A magnetic recording medium according to claim 1 wherein the surface layer has a thickness less than 0.1 μm.

4. A magnetic recording medium according to claim 1 wherein said degree of abrasive resistance further results in no visually observed abrasions after 500 reciprocations of said recording medium.

5. A process for producing a magnetic recording medium having a thin magnetic metal film on a non-magnetic base, comprising applying a coating solution of a polymer containing an unsaturated bond polymerizable by radiation on either the thin magnetic metal film or the other side of the base or both, and irradiating the resulting polymer coating to form a surface layer, with a thickness less than 0.5 μm, said polymer having an unsaturated bond polymerizable by radiation being an unsaturated polyester, an unsaturated polyacrylate or an unsaturated polycarbonate and having a molecular weight of 1,000 to 20,000.

6. A magnetic recording medium according to claim 5 wherein the radiation is electron beams which are applied at an acceleration voltage of 100 to 300 kilovolts until the absorbed dose is from 2 to 10 megarads.

7. A magnetic recording medium according to claim 6 wherein a lubricant is incorporated in or a lubricant layer is formed on the surface layer formed by radiation.

8. A magnetic recording medium according to claim 5 wherein the radiation is ultraviolet rays from a UV lamp (80 W/cm) for a period of 0.1 to 10 seconds.

* * * * *